(12) United States Patent
Ackermann

(10) Patent No.: US 7,392,889 B2
(45) Date of Patent: Jul. 1, 2008

(54) HYDRODYNAMIC CLUTCH DEVICE

(75) Inventor: Jürgen Ackermann, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 265 days.

(21) Appl. No.: 11/304,401

(22) Filed: Dec. 15, 2005

(65) Prior Publication Data

US 2006/0124421 A1    Jun. 15, 2006

(30) Foreign Application Priority Data

Dec. 15, 2004   (DE) ....................... 10 2004 060 257

(51) Int. Cl.
 *F16H 45/02*    (2006.01)
(52) U.S. Cl. ............... 192/3.29; 192/113.36; 192/70.28
(58) Field of Classification Search ................. None
See application file for complete search history.

(56) References Cited

U.S. PATENT DOCUMENTS

| | | | |
|---|---|---|---|
| 3,185,273 A | | 5/1965 | Smirl |
| 4,108,289 A | | 8/1978 | Arai et al. |
| 4,431,094 A | | 2/1984 | Parthuisot et al. |
| 4,924,987 A | * | 5/1990 | Kennedy ................. 192/58.8 |
| 5,575,363 A | | 11/1996 | Dehrmann et al. |
| 5,732,804 A | | 3/1998 | Wienholt |
| 2001/0042666 A1 | * | 11/2001 | Kundermann et al. ...... 192/3.29 |
| 2002/0011392 A1 | * | 1/2002 | Yoshimoto et al. .......... 192/212 |

FOREIGN PATENT DOCUMENTS

| | | |
|---|---|---|
| DE | 35 43 013 | 6/1987 |
| DE | 198 12 865 | 9/1999 |
| DE | 102 33 335 | 2/2004 |
| EP | 0 770 797 | 5/1997 |
| FR | 2 478 770 | 9/1981 |
| FR | 2 556 807 | 6/1985 |
| JP | 53-032264 | 3/1978 |
| JP | 05-296313 | 11/1993 |

OTHER PUBLICATIONS

Search Report dated Aug. 8, 2007 for the corresponding European Application No. 05 02 6296.

* cited by examiner

*Primary Examiner*—Richard M. Lorence
*Assistant Examiner*—Edwin A Young
(74) *Attorney, Agent, or Firm*—Cohen Pontani Lieberman & Pavane LLP

(57) ABSTRACT

A hydrodynamic clutch device includes a clutch housing connected to a drive, a pump wheel connected to the clutch housing, and a turbine wheel connected to a takeoff, the turbine wheel and the pump wheel forming a hydrodynamic circuit. A bridging clutch which is essentially surrounded by the hydrodynamic circuit includes a piston and a friction surface which can be acted on by the piston to connect the drive to the takeoff independently of the hydrodynamic circuit, the piston having one surface facing a pressure space and an opposite surface facing the hydrodynamic circuit. A pressure circuit includes a first pressure medium line to supply the hydrodynamic circuit with clutch fluid and a second pressure medium line to supply the pressure space with clutch fluid. A seal at least reduces the exchange of fluid between the hydrodynamic circuit and the pressure space, and a throttle allows a defined exchange of fluid between the hydrodynamic circuit and the pressure space.

16 Claims, 2 Drawing Sheets

HYDRODYNAMIC CLUTCH DEVICE

BACKGROUND OF THE INVENTION

1. Field of the Invention

The invention pertains to a hydrodynamic clutch device of the type having a clutch housing connected to a drive; a pump wheel connected to the clutch housing, the pump wheel having a hub; a turbine wheel connected to a takeoff, the turbine wheel and the pump wheel forming a hydrodynamic circuit; a bridging clutch having a piston and at least one friction surface which can be acted on by the piston to connect the drive to the takeoff independently of the hydrodynamic circuit, the piston having one surface facing the friction surface; a pressure space for exerting fluid pressure on the piston; and a pressure circuit including a first pressure medium line to supply the hydrodynamic circuit with clutch fluid and a second pressure medium line to supply the pressure space with clutch fluid.

2. Description of the Related Art

U.S. Pat. No. 5,575,363 describes a hydrodynamic clutch device designed as a hydrodynamic torque converter, the clutch housing of which is attached for rotation in common in the conventional manner to a drive, such as an internal combustion engine. The clutch device comprises a pump wheel, which works together with a turbine wheel and a stator to form a hydrodynamic circuit. Whereas the turbine wheel is connected nonrotatably to a takeoff, such as a gearbox input shaft, the stator is mounted by way of a freewheel on a support shaft, which is provided radially between a pump wheel hub and the gearbox input shaft. In addition, the hydrodynamic clutch device also has a bridging clutch with a piston, which is connected nonrotatably but with freedom of axial movement to the clutch housing.

The hydrodynamic clutch device is designed as a two-line system, as a result of which the following pressure and flow relationships are created:

A first pressure medium line for supplying the hydrodynamic circuit is formed by thrust washers, one of which is located on each side of the freewheel of the stator, and each of which is provided with flow channels for clutch fluid. This first line is connected to a first flow route, which has flow channels, one of which is located radially between the pump wheel hub and the support shaft, the other radially between the support shaft and the gearbox input shaft. When the pressure in the hydrodynamic circuit is positive, the piston is pushed toward the adjacent housing cover of the clutch housing and is thus carried along rotationally by the clutch housing when the friction surfaces provided there engage. Conversely, this rotation in common stops when pressure medium is supplied through a second pressure medium line to a pressure space assigned to the piston and located axially between the piston and the housing cover. As a result of this supply of fluid, the pressure in this pressure space becomes greater than that in the hydrodynamic circuit, and the piston is thus shifted axially toward the hydrodynamic circuit. The second pressure medium line is connected to a second flow route, which leads through a central bore in the gearbox input shaft. Each of the two flow routes is connected to its own fluid reservoir.

The essential principle of this type of two-line system is that the bridging clutch serves as a separation point between the hydrodynamic circuit and the pressure space. This arrangement also represents the essential disadvantage the two-line system for the following reason. The friction surface, at least one of which is provided, fulfills two different functions when the bridging clutch is engaged, namely, that of transmitting torque from the clutch housing to the takeoff so that the hydrodynamic circuit is bypassed, and also that of sealing the hydrodynamic circuit off against the pressure space, which is essentially pressureless in this operating state. If the sealing action is inadequate because of overgenerous grooving in the area of the friction surfaces, for example, an undesirably large volume clutch fluid will be discharged from the hydrodynamic circuit via the bridging clutch into the pressure chamber and thus out of the clutch housing, and this lost volume would have to be replaced from the fluid reservoir. Conversely, if the sealing action in the area of the bridging clutch is too effective because the grooving in the area of the friction surfaces is very limited or because there is no grooving at all, the problem would result that the friction surfaces will become glazed very quickly and thus the friction linings in the area of the friction surfaces will be destroyed, especially when the slippage between the piston and the clutch housing causes the temperature of the minimum of one friction surface to increase. It is therefore necessary to produce a precisely defined flow in the area of the friction surfaces, and for this purpose it is necessary to conduct extensive testing with grooving of different dimensions. But even if the grooving is correctly dimensioned, wear or manufacturing tolerances will make it impossible to maintain the exact, desired volume flow rate of clutch fluid.

To solve this problem, designs are known in which the grooving no longer determines the volume flow rate passing through the bridging clutch in the engaged state. Instead, at least one point of throttled flow performs this function, which, according to U.S. Pat. No. 5,732,804, is provided in the piston of the bridging clutch in the radial area of the minimum of one friction surface. This throttled flow serves to supply a precisely defined volume flow rate of clutch fluid to the grooving assigned to the minimum of one friction surface. Although this eliminates the need to perform complicated tests to determine the dimensions of the grooving, it has been found that bridging clutches with these types of throttled flows can provide only certain areas of the friction surfaces with a flow of fluid and that it is impossible to prevent with sufficient reliability certain other areas from becoming overheated.

SUMMARY OF THE INVENTION

The invention is based on the task of designing a clutch device based on the two-line system in such a way that, with modest technical effort, sufficient and uniform cooling of at least one friction surface of a bridging clutch is guaranteed, while a precisely predetermined, limited volume flow rate between a hydrodynamic circuit and a pressure chamber assigned to the piston of the bridging clutch can be provided at the same time.

According to the invention, the pressure space is bounded by first, second, and third walls, the first wall being formed by the clutch housing, the second wall being the one surface of the piston, and the third wall being fixed to the first wall in a pressure-tight manner. A seal is effective between the first and second walls to at least substantially reduce exchange of fluid between the hydrodynamic circuit and the pressure space, and a throttle allows a defined exchange of fluid between the hydrodynamic circuit and the pressure space, the throttle being formed in the third wall. It is essential here that the bridging clutch be located in such a way that it is surrounded completely or almost completely by the hydrodynamic circuit. As a result, the bridging clutch does not form a sealing point between zones of different pressures inside the clutch housing. The same pressure, namely, the pressure of the hydrodynamic circuit, is therefore present both on the flow inlet side and on the flow outlet side of the minimum of one friction surface of the bridging clutch. It is thus possible to provide groovings with large cross sections or possibly a plurality of groovings with smaller cross sections to ensure the intensive, uniform cooling of the friction surfaces. This results in no disadvantage, because the volume of fluid passing by the minimum of one friction surface along this route cannot leave the hydrodynamic circuit. Instead, the boundary between the hydrodynamic circuit and the pressure space is at a point remote from the bridging clutch, preferably on the side of the piston facing the bridging clutch, but with a certain radial distance from the bridging clutch.

A housing cover of the clutch housing preferably forms the first wall of the pressure space, which cooperates with the piston, which is axially offset toward the turbine wheel and which therefore forms the second wall. One side of the piston therefore works together with the first wall to form the axial boundaries of the pressure space, whereas the other side creates a barrier, impermeable to clutch fluid, between the pressure space and the hydrodynamic circuit. Consequently, the hydrodynamic circuit is adjacent to the side of the piston which faces away from the pressure space.

The pressure space also has a boundary radially on the outside, this being provided by an appropriate seal, which acts between the housing cover and the piston. For this purpose, a third wall, which is attached in a pressure-tight manner to the housing cover by means of, for example, a weld, is preferably provided on one side; and on the other side a formation is provided in the radial area of the piston closest to the third wall. At least part of this formation is essentially parallel to the third wall and is so close to it that it forms a narrow gap. The seal can thus be mounted, for example, in a recess in the third wall, so that it comes to rest against the side of the formation on the piston which faces the third wall.

Because of this special design of the hydrodynamic clutch device, there is no connecting point permeable to clutch fluid between the pressure space and the hydrodynamic circuit. As a result, a throttle point can be provided in the best possible position in the clutch housing, i.e., in the most suitable position for a connecting point. The dimensions of this throttle point guarantee a precisely defined exchange of clutch fluid between the pressure space and the hydrodynamic circuit in both directions of flow. Thus, when the bridging clutch is engaged, the hydrodynamic circuit can be filled through a first pressure medium line, which is preferably realized in the form of thrust washers, which are assigned to the hydrodynamic circuit; these washers form the axial boundaries of the freewheel of the stator and are provided with appropriate channels. The hydrodynamic circuit is supplied with fresh clutch fluid through these channels in the thrust washers, whereas heated or spent clutch fluid can leave via the throttle point and enter the pressure space at an exactly defined volume flow rate. From there, the fluid can leave the clutch housing through a second pressure medium line. To disengage the bridging clutch, clutch fluid must merely be introduced through the second pressure medium line into the pressure space, where—if the seal is located in the radially outer area as previously mentioned—it can expand all the way to this radial area. When the pressure space is being supplied with clutch fluid, the clutch housing is usually rotating around its axis of rotation. Therefore, the movement of the pressure medium in the pressure space toward the radially outward area is assisted by centrifugal force. As a result, the piston can be moved back very quickly when the command is given. The small axial dimensions of the pressure space between the first wall and the piston also have an advantageous effect in this regard.

The first wall is preferably connected to the piston positively or for rotation in common by means of the journal hub of the clutch housing and an anti-twist device, so that this wall allows the piston to accompany its own rotational movement around the axes of rotation of the clutch housing. At the same time, however, the freedom of the piston to shift axially, which is necessary for the engaging and disengaging movements, is ensured by attaching it preferably to the anti-twist device by means of an axial spring-loading component.

In operating modes of the hydrodynamic clutch device in which large amounts of heat must be carried away from the clutch housing by the clutch fluid present in the hydrodynamic circuit, it can be necessary to replace large amounts of this clutch fluid with fresh clutch fluid. But, as previously explained, the only flow connection between the pressure space and the hydrodynamic circuit is through the throttle point, and the flow rate through this point is predetermined in particular by the desired flow rate in the hydrodynamic circuit. For this reason, other possibilities must be created for conducting, if necessary, large volumes of clutch fluid out of the hydrodynamic circuit; ideally, this would be done precisely when the hydrodynamic circuit is being filled up with fresh clutch fluid via the first pressure medium line, which, in the case of the inventive design of the clutch device, is what occurs when the bridging clutch is disengaged. In this operating state, the pressure in the pressure space is greater than that in the hydrodynamic circuit, so that the positive pressure in the pressure space can open a nonreturn valve located preferably in the piston and thus in the second wall of the pressure space, as a result of which at least one additional flow opening is made available, which is otherwise impassable to clutch fluid because of the nonreturn valve. As soon as a sufficient amount of the clutch fluid present in the hydrodynamic circuit has been replaced, the nonreturn valve can be switched back by increasing the pressure in the hydrodynamic circuit by way of the first pressure medium line, as a result of which the minimum of one additional receiving opening is closed again. The nonreturn valve is preferably designed as a mushroom-shaped valve with a sealing cover, which can be pressed against the second wall, and with a shaft, which is captured in a receiving opening in the second wall but is held so that it can shift in the axial direction. Both the sealing cover and the shaft are preferably made of heat and pressure resistant.

As previously explained, the clutch-release operation occurs very quickly because of the compact design of the pressure space. There is therefore usually no need for the assistance of an axial spring-loading component. Nevertheless, it can be advantageous to provide axial spring-loading to assist the clutch-release operation, in the sense that the axial spring-loading ensures that the piston will move away very quickly from the minimum of one friction surface of the bridging clutch. This means that slippage losses in the area of the bridging clutch can be almost entirely eliminated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
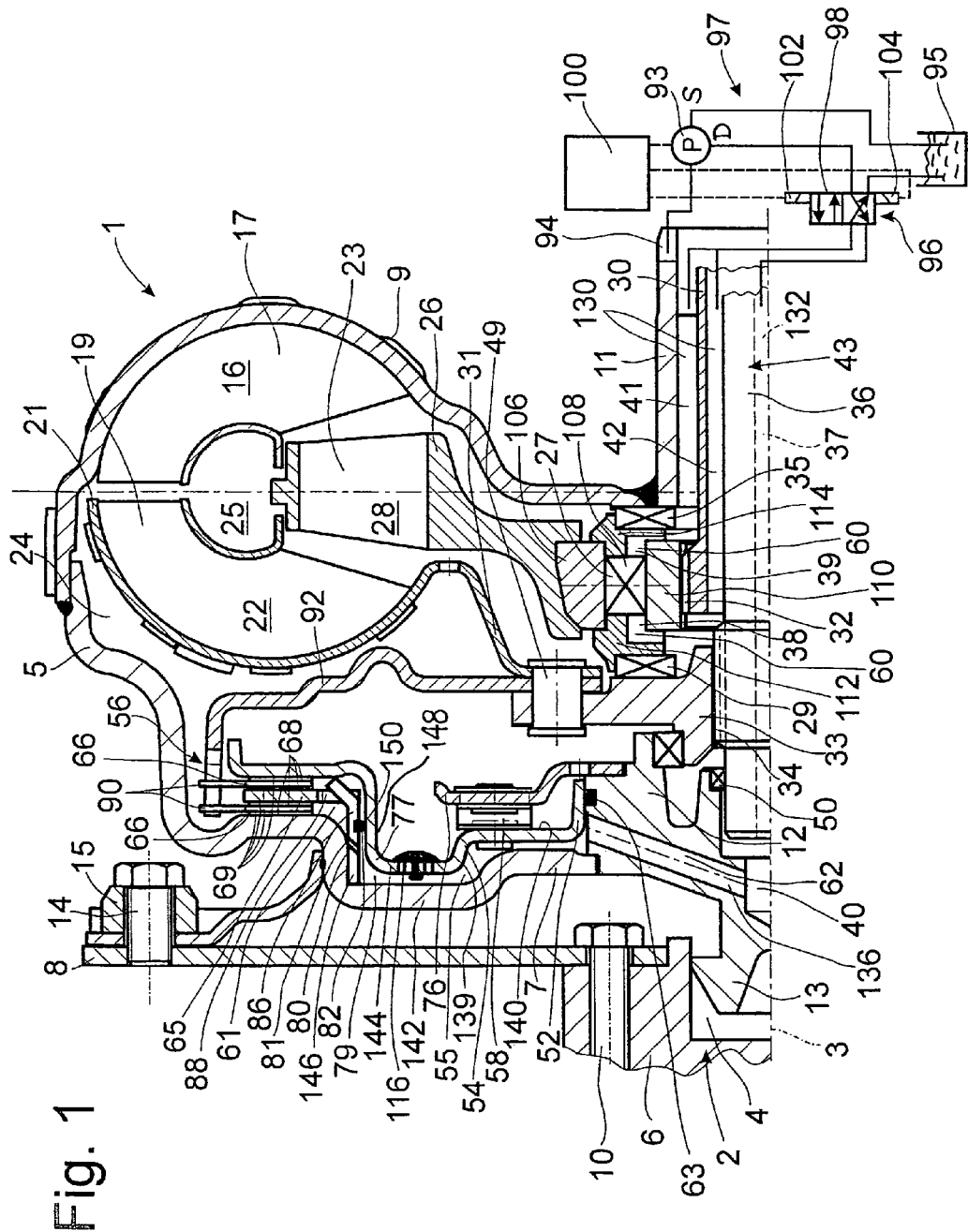
FIG. 1 shows the upper half of a longitudinal cross section through a hydrodynamic torque converter with bridging clutch based on the two-line concept.

FIG. 1 shows a hydrodynamic clutch device 1 in the form of a hydrodynamic torque converter, which is able to rotate around an axis of rotation 3. The hydrodynamic torque converter has a clutch housing 5. On the side of the housing facing a drive 2, such as an internal combustion engine with a crankshaft 6, the housing has a cover 7, which is permanently connected to a pump wheel shell 9. This merges with a pump wheel hub 11 in the radially inner area.

To return to the housing cover 7, this cover has, in the radially inner area, a bearing journal hub 12 carrying a bearing journal 13. The bearing journal 13 is mounted in a recess 4 in the crankshaft 6 to center the clutch housing 5 on the drive side. The housing cover 7 also has a fastening mount 15, which serves to attach the clutch housing 5 to the crankshaft 6 by way of a flexplate 8, namely, by means of fastening elements 14, preferably in the form of bolts. The flexplate 8 itself is attached by fastening elements 10, also preferably in the form of bolts, to the crankshaft 6.

The previously mentioned pump wheel shell 9 and the pump wheel vanes 16 together form a pump wheel 17, which works together with a turbine wheel 19, consisting of a turbine wheel shell 21 and turbine wheel vanes 22, and with a stator 23. The latter has stator vanes 28 on a stator hub 26 and cooperates with the pump wheel 17 and the turbine wheel 19 to form a hydrodynamic circuit 24, which encloses an internal torus 25.

The stator 23 is mounted by its hub 26 on an outer body 106 of a freewheel 27. The outer body is mounted by way of a rolling element part 108 on an inner body 110. The outer body 106 centers the inner body 110 by means of a drive-side thrust washer 112 and a takeoff-side thrust washer 114. On the drive side, the outer body is supported axially against the journal hub 12 by way of the drive-side thrust washer 112, a drive-side axial bearing 29, a turbine wheel hub 33, and a bearing 44, whereas on the takeoff side, the outer body is supported against the pump wheel hub 11 by the takeoff-side thrust washer 114 and a takeoff-side axial bearing 35.

The stator 23 is mounted by way of the inner body 110 of its freewheel 27 on a support shaft 30 by means of a set of teeth 32 so that it can move axially but cannot rotate relative to the support shaft. The support shaft is installed radially inside the pump wheel hub 11 in such a way that an essentially annular, radially outer flow channel 41 is formed. The support shaft 30, designed as a hollow shaft, for its own part surrounds a gearbox input shaft 36, acting as a power takeoff 43, leaving an essentially annular flow channel 42. The gearbox input shaft has a central bore 37 for the passage of clutch fluid. Whereas the two flow channels 41, 42 are intended to serve as the first flow route 130, the central bore 37 serves as the second flow route 132. The gearbox input shaft 36 has a set of teeth 34 by which it carries the previously mentioned turbine wheel hub 33 in a nonrotatable but axially displaceable manner and is sealed off against the journal hub 12 by a seal 50. The turbine wheel hub 33 is connected nonrotatably by through-rivets 49 both to the base 31 of the turbine wheel 19 and to an outer plate carrier 92 of the bridging clutch 56.

The previously mentioned flow channels 41, 42 lead to the hydrodynamic circuit 24 by way of the channels 38, 39 in the thrust washers 112, 114 serving as the first pressure medium line 60. The central bore 37, however leads to a transition space 40, from which at least one channel 136 extending through the journal hub 12 with a radial component proceeds and thus serves as the second pressure medium line 62. This line opens out into a pressure space 55 axially between the housing cover 7 and a piston 54 of the bridging clutch 56, so that the housing cover 7 provides the first wall 142 of the pressure space 55, whereas the side 139 of the piston 54 which faces the pressure space 55 provides the second wall 144 of the pressure space 55. The side of the piston facing away from the pressure space 55 forms a boundary of the hydrodynamic circuit 24.

Rivets (not shown) can be used to attached the radially inner area of the piston 54 by way of an axial spring-loading component 58 in the form of tangential leaf springs to an anti-twist device 76, which is attached to the journal hub 12 of the clutch housing 5.

The inner plate carrier 86 of the bridging clutch 56, which is attached in a pressure-tight manner to the housing cover 7 by welding, for example, and which thus serves as the third wall 146 of the pressure space 55, forms the boundary of the pressure space 55 at the radially outer end 79. A formation 148 on the piston 54 is essentially parallel to the inner plate carrier 86 and extends toward the hydrodynamic circuit. This formation is so close to the inner plate carrier 86 that only a narrow gap remains. A seal 82 is mounted in a recess 150 in the side of the inner plate carrier 86 which faces the formation 148. This seal rests against the formation 148 and thus makes the pressure space 55 at least essentially pressure-tight with respect to the hydrodynamic circuit 24. The inner plate carrier 86 also carries a throttle point 80 in the form of at least one through-opening 81, which connects the pressure space 55 to the hydrodynamic circuit 24.

In the radially central area 77 of its radial dimension, the piston 54 can be provided with a nonreturn valve 116, the design, action, and function of which will be discussed in detail elsewhere.

In correspondence with the pressure in the first pressure medium line 60 or in the second pressure medium line 62 and thus as a function of the pressure relationships in the hydrodynamic circuit 24 and in the pressure space 55, the piston 54 can be moved in the axial direction between two different limit positions, which will be discussed in greater detail below. By means of its base 52, the piston 54 is supported on the journal hub 12 so that it can slide back and forth axially, where a piston seal 63 let into the journal hub 12 seals the joint between the hub and the base 52 of the piston.

In the radially outer area of the piston 54, a radially inner plate 65, which is attached nonrotatably to the inner plate carrier 86 by means of a set of teeth 88, is located axially between the housing cover 7 and the piston 54. A radially outer plate 66 is provided on each side of the radially inner plate, and each radially outer plate is mounted nonrotatably by sets of teeth 90 on an outer plate carrier 92. Each of the radially outer plates 66 has friction linings 68 on both sides. The two friction linings 68 which face the radially inner plate 65 cooperate with friction zones on the radially inner plate 65 to form a friction area 69, whereas one of the two friction linings 68 facing away from the radially inner plate 65 cooperates with a friction zone on the housing cover 7 to form a friction area 69. The other one of these two friction linings 68, furthermore, cooperates with a friction zone on the piston 54 to form a friction area 69.

The individual friction areas 69 are activated as soon as the friction linings 68 enter into working connection with their assigned friction zones, which is accomplished by the engagement of the piston 54 and thus of the bridging clutch 56. The engaging movement of the piston 54 stops when the piston 54 has traveled as far as it can within its range of axial movement and comes as close as possible to the housing cover 7. So that this engaging operation can occur, the pressure in the hydrodynamic circuit 24 must be built up to the point that it is greater than the pressure in the pressure space 55. Because the radially inner part of a clutch space 61, which accommodates the plates 65, 66, is connected via the bridging clutch 56 to the hydrodynamic circuit 24 and the radially outer part of this space is connected directly to the circuit, and because the bridging clutch 56, as can be seen on the basis of FIGS. 2 and 3, has grooves 70 in the area of the friction linings 68 of a size or in a number which allows a comparatively high flow rate of clutch fluid to pass, the clutch space 61 is to be considered part of the hydrodynamic circuit 24.

Conversely, the individual friction areas 69 are deactivated as soon as the working connection of the friction linings 68 with their assigned friction zones is broken, which occurs when the piston 54 disengages and thus the bridging clutch 56 is released. The disengaging movement of the piston 54 stops when the piston 54 has traveled axially as far as possible within its range of axial movement away from the housing cover 7. So that the disengaging operation can occur, the pressure generated in the pressure space 55 must be higher than that in the hydrodynamic circuit 24 thus in the clutch space 61.

The piston 54 of the bridging clutch 56 is engaged and disengaged in the following way:

The previously mentioned flow channels 41, 42, the former located radially between the pump wheel hub 11 and the support shaft 30, the latter located between the support shaft and the gearbox input shaft 36, serve to supply the hydrodynamic circuit 24 with clutch fluid via the first pressure medium lines 60 and the channels 38, 39 in the thrust washers 112, 114, whereas the central bore 37 in the gearbox input shaft 36 supplies clutch fluid to the pressure space 55 via the transition space 40 and the second pressure medium lines 62. To guarantee that the amounts being supplied are always correct, a pressure circuit 97 shown in FIG. 1 is required. This circuit has a pressure source 93, which is preferably a pump driven in the conventional manner by a drive cam 94 on the pump wheel hub 11. The suction side S of the pressure source can be connected to a fluid reservoir 95, whereas its delivery side D can be connected either to the flow channels 41, 42 or to the central bore 37. The fluid is supplied either to the flow channels 41, 42 or to the central bore 37 in correspondence with the commands given by a control unit 100, which is in working connection with a switching device 96 in the form of a switching valve 98 in the pressure circuit 97. The control unit is also connected to the pressure source 93. The switching valve 98 is preferably designed as a 4/2-port directional control valve, actuated by electromagnets 102, 104, which deflect the switching device 96 in correspondence with the commands received from the control unit 100.

So that the piston 54 can be moved into the engaged position shown in FIG. 1, the switching device 96 is actuated by activation of the electromagnet 102 upon the command of the control unit 100 in such a way that the magnet pushes the switching valve 88 out of the position shown in FIG. 1 into a second position, in which the delivery side D of the pressure source 93 is connected to the flow channels 41, 42. The pressure increases there as a result and simultaneously decreases in the central bore 37 of the gearbox input shaft 36, which is connected now via the switching valve 98 to the fluid reservoir 95.

The clutch fluid arriving through the flow channels 41, 42 travels via the first pressure medium line 60 into the hydrodynamic circuit 24, where it exerts pressure on the piston 54 in the direction toward the pressure space 55, which starts to empty through the second pressure medium line 62. Because the pressure thus building up in the hydrodynamic circuit 24 is greater than that in the pressure space 55, force is exerted on the takeoff side of the piston wall 140, as a result of which the piston 54 is shifted toward the housing cover 7. The area in which the piston 54 is subjected to the actuating force ends, however, in the radial area where the seal 82 is located, because the clutch space 61 begins radially outside this seal, and the pressure in this space is basically the same as that in the hydrodynamic circuit 24, which is why this space is considered part of the hydrodynamic circuit 24.

Figure 2:
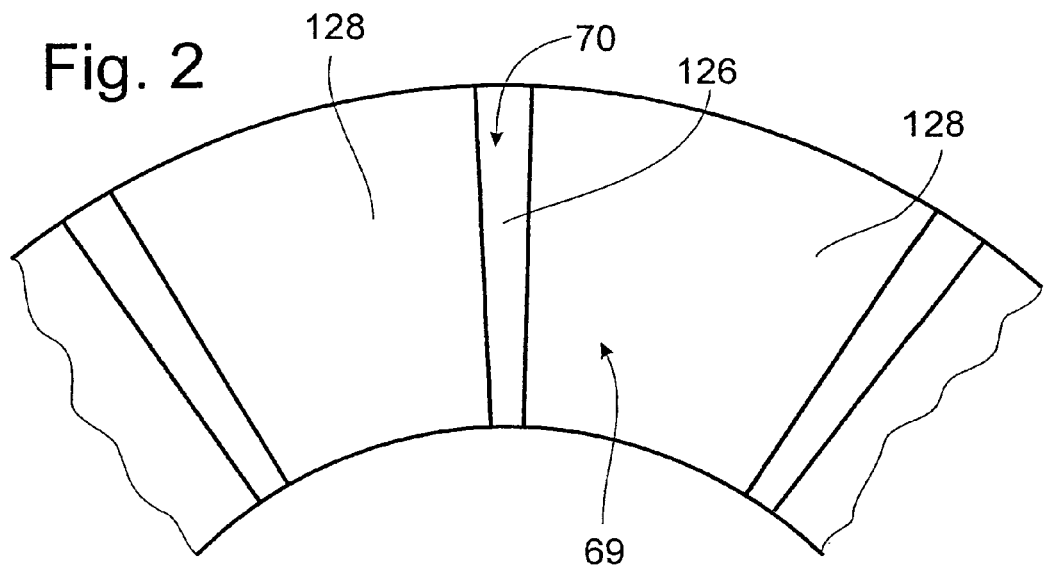
FIG. 2 shows a plan view of the friction surface of the bridging clutch.
Figure 3:
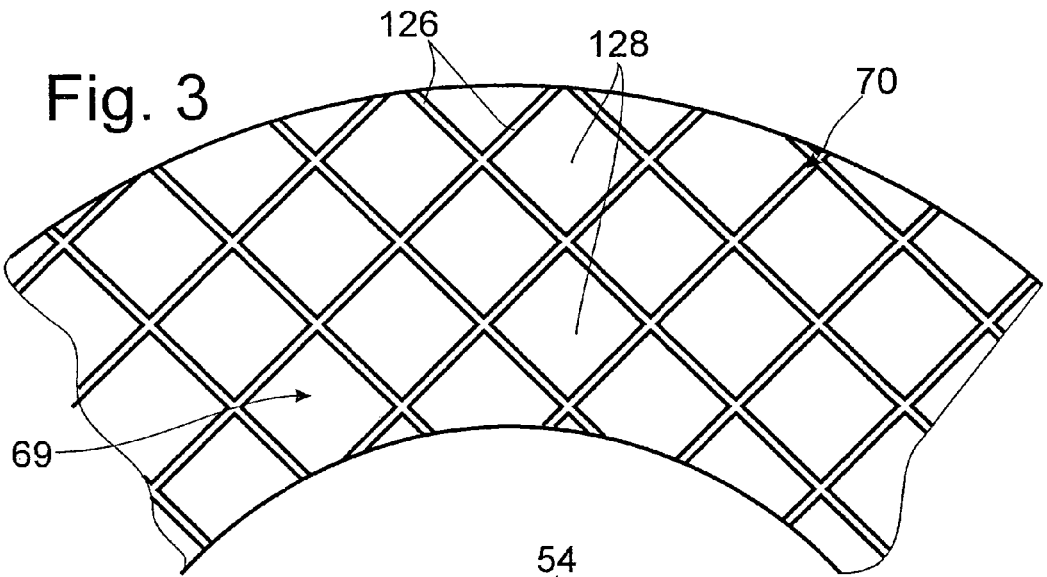
FIG. 3 is similar to FIG. 2 but shows a different design.

The progressive engaging movement of the piston 54 interferes to only an insignificant degree with the flow of clutch fluid through the bridging clutch 56, and even after the piston 54 is fully engaged the flow can continue, because, as shown in FIGS. 2 and 3, grooving 70 is provided between the pairs of friction lining segments 128 in the area of the friction surfaces 69; this grooving allows the clutch fluid to flow at a high rate through the bridging clutch 56 and thus ensures that the friction surfaces 69 are cooled efficiently. This grooving 70 is designed either according to FIG. 2 with wide groove channels 126 between the friction segments 128 of the friction surface 69 or according to FIG. 3 with a plurality of channels 126 between the respective friction segments 128.

A flow-intensive design of the friction surfaces 69 of this type in a hydrodynamic torque converter designed as a two-line system, in which a first pressure medium line 60 supplies clutch fluid to the hydrodynamic circuit 24 and a second pressure medium line 62 supplies clutch fluid to the pressure space 55, is possible only because, in contrast to the conventional design of such two-line systems, the only function of the bridging clutch 56 is to transmit torque in the engaged state of the piston 54 from the drive 2 to the takeoff 43, the hydrodynamic circuit 24 thus being bypassed, and does not fulfill the additional function of sealing off the hydrodynamic circuit 24 against the pressure space 55. The reason for this is that the bridging clutch 56 is located in the path along which the clutch fluid flows between the hydrodynamic circuit 24 and the clutch space 61, which is to be considered a part of the hydrodynamic circuit. This means that the clutch fluid leaving via the bridging clutch 56 can leave the hydrodynamic circuit 24 only at the rate predetermined by the throttle point 80. The hydrodynamic circuit 24 is meanwhile isolated from the pressure space 55 by the inner plate carrier 86 and the seal 82. If a faster exchange of clutch fluid is desired, however, the throttle point 80 can be supplemented by the flow-through opening 124 of the nonreturn valve 116, which will be explained in detail below.

To disengage the piston 54, the switching device 96 is now actuated by activation of the electromagnet 104 under the command of the control unit 100 in such a way that the magnet pushes the switching valve 88 into the position shown in FIG. 1, in which the delivery side D of the pressure source 93 is connected to the central bore 37 in the gearbox input shaft 36. The pressure there increases as a result, whereas it drops simultaneously in the flow channels 41, 42, which are now connected via the switching valve 98 to the fluid reservoir 95.

As a result of this pressure and connection situation, clutch fluid is conducted from the fluid reservoir 95 via the central bore 37 of the gearbox input shaft 36 and via the pressure medium line 62 into the pressure space 55. Assisted by the rotation of the clutch housing 5 around the axis of rotation 3, the clutch fluid flows radially outward, where the seal 82 prevents it from traveling any farther, except for the small amount which is able to pass through the throttle point 80. The pressure space 55 is filled quickly because of its small dimensions, so that a positive pressure versus the hydrodynamic circuit 24 is built up very quickly.

As clutch fluid continues to enter the clutch space 61 through the throttle point 80, the rapidly disengaging piston 54 allows the fluid to pass easily through the area of the bridging clutch 56, so that fresh clutch fluid enters the hydrodynamic circuit 24. Without any change in the pressure conditions in the hydrodynamic circuit 24, therefore, heated clutch fluid is emptied via the first pressure medium line 60 into the flow channels 41, 42 and from there into the fluid reservoir 95.

If the axial spring-loading component 58 which ties the piston 54 to the journal hub 12 and thus to the clutch housing 5 acts in a direction such that it pulls the piston 54 away from the housing cover 7, the disengaging movement of the piston 54 is supported by the axial spring-loading 58 and thus accelerated, which has the effect of reducing the drag torques in the friction areas 69 to a minimum.

Figure 4:
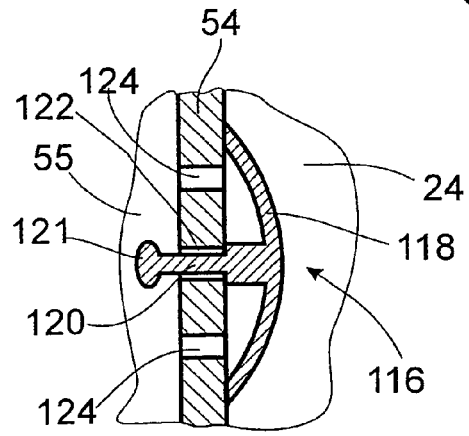
FIG. 4 shows an enlarged, detailed view of a nonreturn valve.

If it is desirable to exchange a large amount of clutch fluid in the hydrodynamic circuit 24 while the piston 54 is disengaged, it is possible to use a nonreturn valve 116 in the piston 54. This can be designed as shown in FIG. 4 in the form of a mushroom-shaped plastic part with a sealing cover 118 and an essentially cylindrical shaft 120 formed on the cover. The shaft passes axially through a receiving opening 122 in the piston 54 and is held in this receiving opening 122 by a capture device 121 in such a way that the shaft can shift axially but cannot come loose from the piston 54. Immediately adjacent to the receiving opening 122 for the shaft 120, the piston 54 is penetrated by at least one flow opening 124 through-opening 126, through which the sealing cover 118 can be actuated from the side of the pressure space 55 when the pressure in the pressure space 55 is higher than that in the hydrodynamic circuit 24. As a result, via the flow opening 124, the sealing cover 118 is lifted away from the opposite side of the piston 54, so that an escape route, supplementing the throttle point 80, for clutch fluid through the flow opening 124 is released. Depending on the degree to which the sealing cover 118 is opened, which is a function of the pressure difference, and depending on the dimensions of its diameter and the number and/or size of the flow openings 124, an appropriate throughput of clutch fluid from the pressure space 55 into the hydrodynamic circuit 24 and from this circuit into the fluid reservoir 95 can be generated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic clutch device comprising:
   a clutch housing connected to a drive;
   a pump wheel connected to the clutch housing, the pump wheel having a hub;
   a turbine wheel connected to a takeoff, the turbine wheel and the pump wheel forming a hydrodynamic circuit;
   a bridging clutch essentially surrounded by the hydrodynamic circuit, the bridging clutch comprising a piston and at least one friction surface which can be acted on by the piston to connect the drive to the takeoff independently of the hydrodynamic circuit, the piston having one surface facing the at least one friction surface and an opposite surface;
   a pressure space for exerting fluid pressure on the piston, wherein the pressure space is bounded axially by first, second, and third walls, the first wall being formed by the clutch housing, the second wall being the one surface of the piston, the third wall being fixed to the first wall in a pressure-tight manner;
   a pressure circuit comprising a first pressure medium line to supply the hydrodynamic circuit with clutch fluid and a second pressure medium line to supply the pressure space with clutch fluid;
   a seal which is effective between the second and third walls to at least substantially reduce exchange of fluid between the hydrodynamic circuit and the pressure space; and
   a throttle which allows a defined exchange of fluid between the hydrodynamic circuit and the pressure space, the throttle being formed in the third wall.

2. The hydrodynamic clutch device of claim 1 wherein the throttle is dimensioned based on predetermined pressure and filling conditions in the hydrodynamic circuit.

3. The hydrodynamic clutch device of claim 1 further comprising:
   a clutch fluid reservoir; and
   a pressure source connected to the reservoir;
   wherein the first pressure medium line comprises a first flow route between the pump wheel hub and the takeoff and connects the fluid reservoir to the hydrodynamic circuit, and the second fluid pressure line comprises a second flow route in the takeoff and connects the fluid reservoir to the pressure space.

4. The hydrodynamic clutch device of claim 3 wherein the takeoff comprises a gearbox input shaft having a central bore, the central bore forming the second flow route, the clutch device further comprising:
   a support shaft for a freewheel, the support shaft radially surrounding the gearbox input shaft and forming an inner annular flow channel, and
   a turbine wheel hub radially surrounding the support shaft and forming an outer annular flow channel,
   wherein at least one of the annular flow channels forms the first flow route.

5. The hydrodynamic clutch device of claim 1 wherein the seal is mounted on the third wall and extends radially toward the second wall.

6. The hydrodynamic clutch device of claim 5 wherein the piston has an axially extending formation which is in contact with the seal.

7. The hydrodynamic circuit of claim 1 wherein the throttle is formed by at least one through opening in the third wall.

8. The hydrodynamic clutch device of claim 1 further comprising a spring which loads the piston axially with respect to the friction surface of the bridging clutch.

9. The hydrodynamic clutch device of claim 8 wherein the spring loads the piston axially away from the friction surface.

10. The hydrodynamic circuit of claim 8 further comprising an anti-twist device connected non-rotatably to the clutch housing, the spring being mounted to the anti-twist device.

11. The hydrodynamic clutch device of claim 1 wherein the second pressure medium line comprises at least one channel having a radial component connected to the pressure space.

12. The hydrodynamic clutch device of claim 1 wherein the bridging clutch comprises at least one plate, the third wall being formed as a plate carrier which connects the plate non-rotatably to the clutch housing.

13. The hydrodynamic clutch device of claim 1 wherein the second wall separates the pressure space from the hydrodynamic circuit and has a check valve which allows flow when there is positive pressure in the pressure space and stops flow when there is positive pressure in the hydrodynamic circuit.

14. The hydrodynamic clutch device of claim 13 wherein the check valve comprises a stem and a cover, the stem being received through a receiving opening in the second wall, the cover covering at least one flow opening in the second wall when the check valve is closed.

15. The hydrodynamic clutch device of claim 1 wherein the friction surface comprises at least one groove between at least two friction segments.

16. The hydrodynamic clutch device of claim 15 comprising a plurality of grooves between said friction segments.

* * * * *